(12) United States Patent
Bogen et al.

(10) Patent No.: US 10,871,210 B2
(45) Date of Patent: Dec. 22, 2020

(54) GEAR DRIVE ASSEMBLY FOR ACTUATOR SYSTEM

(71) Applicant: BORGWARNER INC., Auburn Hills, MI (US)

(72) Inventors: Martin P. Bogen, Rochester Hills, MI (US); Cody J. Paupert, Dryden, MI (US)

(73) Assignee: BorgWarner Inc., Auburn Hills, MI (US)

( * ) Notice: Subject to any disclaimer, the term of this patent is extended or adjusted under 35 U.S.C. 154(b) by 165 days.

(21) Appl. No.: 15/901,427

(22) Filed: Feb. 21, 2018

(65) Prior Publication Data

US 2019/0257394 A1    Aug. 22, 2019

(51) Int. Cl.
*F16H 19/00* (2006.01)
*F16K 31/04* (2006.01)

(52) U.S. Cl.
CPC ......... *F16H 19/001* (2013.01); *F16K 31/047* (2013.01)

(58) Field of Classification Search
CPC ........ F16H 19/001; F16K 31/47; F02B 39/04; F02B 39/06
See application file for complete search history.

(56) References Cited

U.S. PATENT DOCUMENTS

| | | | | |
|---|---|---|---|---|
| 3,761,000 A * | 9/1973 | Hagstrom | ................. | B41J 11/36 226/37 |
| 3,845,668 A * | 11/1974 | Underwood | .............. | F16H 1/20 74/412 |
| 4,939,945 A * | 7/1990 | Ryder | .................. | B60Q 1/0683 362/427 |
| 5,402,207 A * | 3/1995 | Michlin | ............... | G03G 15/751 399/117 |
| 5,423,232 A * | 6/1995 | Miller | ................. | F16H 55/0806 241/221 |
| 5,993,564 A * | 11/1999 | Witt | ........................ | B08B 3/022 134/26 |
| 6,173,939 B1 * | 1/2001 | Dottavio | ............... | F02D 9/1065 123/339.15 |
| 6,267,352 B1 * | 7/2001 | Semeyn, Jr. | .............. | F02D 9/02 123/339.15 |
| 6,386,178 B1 * | 5/2002 | Rauch | ..................... | F02D 11/10 123/337 |

(Continued)

FOREIGN PATENT DOCUMENTS

JP    2002242995 A    8/2002

OTHER PUBLICATIONS

English language abstract and machine-assisted English translation for JP 2002-242995 extracted from espacenet.com database on Feb. 28, 2018, 15 pages.

(Continued)

*Primary Examiner* — Zakaria Elahmadi
(74) *Attorney, Agent, or Firm* — Howard & Howard Attorneys PLLC (57) ABSTRACT

A gear drive assembly is used with an actuator of an actuator system. The gear drive assembly includes a housing and a gear arrangement disposed in the housing and including at least three gear stages having at least three driven gears. The at least three driven gears alternate between a plastic material and a metal material for each gear of the at least three driven gears.

12 Claims, 10 Drawing Sheets

(56) References Cited

U.S. PATENT DOCUMENTS

| | | | |
|---|---|---|---|
| 6,435,169 B1* | 8/2002 | Vogt | F02D 21/08 |
| | | | 123/568.23 |
| 8,205,520 B2 | 6/2012 | Thoma | |
| 2004/0069285 A1* | 4/2004 | Telep | F02M 26/69 |
| | | | 123/568.23 |
| 2006/0011001 A1* | 1/2006 | Showalter | F16D 28/00 |
| | | | 74/23 |
| 2008/0230040 A1* | 9/2008 | Wilson | F02M 26/54 |
| | | | 123/568.18 |
| 2009/0255506 A1* | 10/2009 | Walker | F02C 6/206 |
| | | | 123/212 |
| 2010/0263618 A1* | 10/2010 | Keefover | F02D 9/1035 |
| | | | 123/190.1 |
| 2012/0097129 A1* | 4/2012 | Damasceno | F02D 9/108 |
| | | | 123/337 |
| 2013/0047941 A1* | 2/2013 | Niwa | F02D 9/1065 |
| | | | 123/90.11 |
| 2013/0065725 A1* | 3/2013 | Matsuda | G03G 15/757 |
| | | | 475/159 |
| 2014/0144407 A1* | 5/2014 | Khan | F16K 31/535 |
| | | | 123/319 |
| 2014/0239760 A1* | 8/2014 | Asai | H02K 7/116 |
| | | | 310/83 |
| 2014/0260726 A1* | 9/2014 | Atar | F16H 57/025 |
| | | | 74/89.16 |
| 2015/0159595 A1* | 6/2015 | Keefover | F16K 31/53 |
| | | | 123/568.24 |
| 2017/0314664 A1 | 11/2017 | Hesse | |
| 2018/0149282 A1* | 5/2018 | Fowler | F16K 31/043 |
| 2019/0003427 A1* | 1/2019 | Kobayashi | F02M 26/26 |
| 2019/0257402 A1* | 8/2019 | Kannan | F16H 57/023 |

OTHER PUBLICATIONS

F-Morat, "Spur Gear Stage for E-Bikes", downloaded from https://f-morat.com/products/plastic-metal-compunds/plastic-metal-connection-application-examples/ on Nov. 7, 2017, 1 page.

Smith, Robert E. et al., "Noise Reduction in Plastic & Powder Metal Gear Sets", AGMA Fall Technical Meeting, 1992, 6 Pages.

* cited by examiner

GEAR DRIVE ASSEMBLY FOR ACTUATOR SYSTEM

BACKGROUND OF THE INVENTION

1. Field of the Invention

The present invention relates generally to actuator systems for use on vehicles and, more specifically, to a gear drive assembly for an actuator system for use on vehicles.

2. Description of Related Art

Many devices in vehicles, such as a turbochargers and exhaust gas recirculation (EGR) valves, use an actuator system to control their functions and performance. For example, in certain actuator systems, pneumatic and electric actuators are used to provide positional control of variable vanes of a turbocharger or a valve plate of an EGR valve to adjust and maintain fluid pressure and fluid flow within an intake manifold of an engine. Controlling the fluid pressure and the fluid flow within the intake manifold provides optimum performance while maintaining legislated vehicle emissions.

Traditionally, the actuator system includes a gear drive assembly which transmits rotational motion to the device. The gear drive assembly provides a plurality of gears which collectively interact to provide a velocity and a torque to the device for moving the device. The gear drive assembly typically has three or more gear stages and uses a metal drive gear with all of the remaining gears being either all made of metal or plastic. For those actuators using all metal gears, the driven gears are typically supported by a ball bearing or a needle bearing system at each driven gear, which are larger and more costly. The all plastic driven gears cannot meet the latest medium to heavy duty vehicle requirements for a number of test cycles with an external load applied due to excessive gear wear causing failure. While an all metal gear system can meet these requirements, such a system is expensive. As such, there remains a need to provide an improved gear drive assembly.

SUMMARY OF THE INVENTION

The present invention provides a gear drive assembly for use with and driven by a motor in an actuator of an actuator system. The gear drive assembly includes a housing and a gear arrangement disposed in the housing and including at least three gear stages having at least three driven gears. The at least three driven gears alternate between a metal material and a plastic material for each gear of the at least three driven gears.

In addition, the present invention provides an actuator system including an output shaft and an actuator capable of moving the output shaft. The actuator includes a motor and a gear drive assembly driven by the motor. The gear drive assembly includes a housing and a gear arrangement disposed in the housing. The gear arrangement includes a drive gear made from a metal material, a first driven gear, a second driven gear, and at least one third driven gear to transmit rotation from the drive gear to the at least one third driven gear, the at least one third driven gear being rotatably coupled with the housing. The first driven gear, the second driven gear, and the at least one third driven gear alternate between a plastic material and a metal material.

One advantage of the present invention is that the gear drive assembly includes at least three stages with a metal drive gear, a driven plastic gear, and then metal-plastic gear material combinations for each subsequent gear. Another advantage of the present invention is that the gear drive assembly, for a metal gear that is radially supported by a metal pin, includes plastic bushings that are utilized to reduce friction at the gear to pin interface. Yet another advantage of the present invention is that the gear drive assembly includes plastic bushings that are flanged so that friction is also reduced in the direction of an axial support surface. Still another advantage of the present invention is that the gear drive assembly solves the issue of excessive gear wear enabling the durability requirements to be met while limiting the cost impact. A further advantage of the present invention is that the gear drive assembly used with actuator systems improves durability and fulfills the latest durability requirements for medium and heavy duty vehicle applications. Yet a further advantage of the present invention is that the cost of the gear drive assembly is lower than existing assemblies that use of all gears made from metal.

Other features and advantages of the present invention will be readily appreciated as the same becomes better understood by reference to the following detailed description when considered in connection with the accompanying drawings.

DETAILED DESCRIPTION OF THE INVENTION

Figure 1:
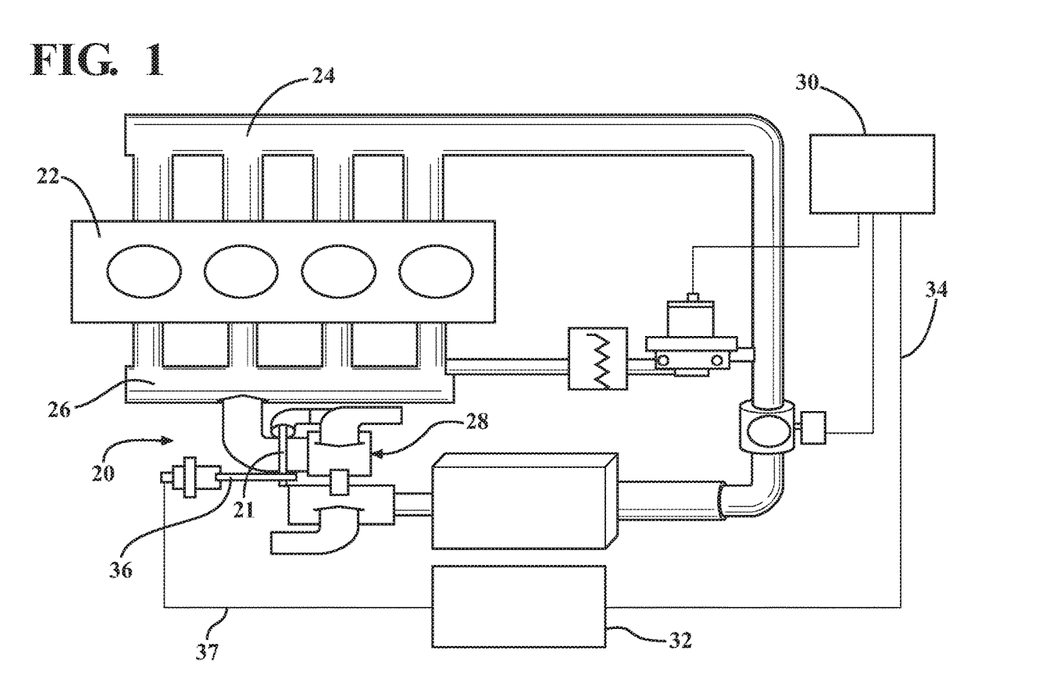
FIG. 1 is a schematic view of an actuator system, according to the present invention, used with an engine, an intake manifold, an exhaust manifold, and a turbocharger.

Referring to the Figures, wherein like numerals indicate like or corresponding parts throughout the several views, an actuator system 20 is generally shown in FIG. 1. The actuator system 20 is typically used for controlling a control shaft 21 within a vehicle (not shown). In one example, the control shaft 21 controls the flow of a fluid to or from an engine 22 of the vehicle. As shown schematically in FIG. 1, the vehicle may include the engine 22, an intake manifold 24 configured to flow air into the engine 22, and an exhaust manifold 26 configured to flow exhaust out of the engine 22. In one embodiment, the control shaft 21 is used in a turbocharger 28 which is fluidly coupled with each of the intake manifold 24 and the exhaust manifold 26 to increase flow of the air into the engine 22 by way of utilizing the energy of the moving exhaust flowing out of the engine 22, as is commonly known to those having ordinary skill in the art. The actuator system 20 is positioned between the exhaust manifold 26 and the turbocharger 28, with the actuator system 20 controlling a position of the turbocharger 28 through the control shaft 21, which in-turn controls the pressure and the flow of the air into the engine 22 through the intake manifold 24 and is commonly referred to as boost pressure. It should be appreciated that the actuator system 20 may be used for controlling a mechanical device that shifts gears, lifts tailgates, lifts windows, etc.

The vehicle may further include an electronic control unit (ECU) 30 and an actuator controller 32. The ECU 30 may be connected to the actuator controller 32 by a wire harness 34 having multiple conductors and connectors. The actuator controller 32 may also be connected to the actuator system 20 by a wire harness 37 having multiple conductors and connectors. For this illustration, the actuator controller 32 is shown as separate component. However, one having ordinary skill in the art will appreciate that the actuator controller 32 may be integrated within the actuator system 20 or the ECU 30.

The ECU 30 may provide an electrical position input signal to the actuator controller 32 that may indicate a desired position of the control shaft 21 as controlled by the actuator system 20. The actuator controller 32 may provide the necessary electrical control signal to the actuator system 20 to achieve the desired position of the control shaft 21.

The actuator system 20 may also provide feedback in the form of an electrical position output signal to the actuator controller 32. A "closed loop" control scheme may be used to maintain a desired position of the control shaft 21 as controlled by the actuator system 20 by comparing the feedback electrical position output signal value to a desired value and may adjust the electrical control signal to the actuator system 20 to maintain the resulting position of the control shaft 21 and the resultant fluid flow and boost pressure. Although the actuator system 20 is shown in FIG. 1 controlling a position of the turbocharger 28, one having ordinary skill in the art will appreciate that the actuator system 20 may be used anywhere within vehicles for controlling the flow of a fluid to or from an engine, such as with an exhaust gas recirculation (EGR) valve, a throttle fluidly coupled to an intake manifold 24, waste gates, exhaust throttles, etc.

The actuator system 20 also includes an output shaft 36, movable between a plurality of positions. The output shaft 36 may be coupled to the control shaft 21 of the turbocharger 28, as described above. The turbocharger 28 may include a turbine (not shown) fluidly coupled with the exhaust manifold 26 and a compressor (not shown) fluidly coupled with the intake manifold 24. The turbine may have a plurality of vanes (not shown). The movement of the control shaft 21 by the movement of the output shaft 36 may vary the orientation of the vanes to alter the flow of the fluid past the turbine, which in-turn alters the pressure and the flow of the fluid from the compressor into the intake manifold 24.

Figure 3:
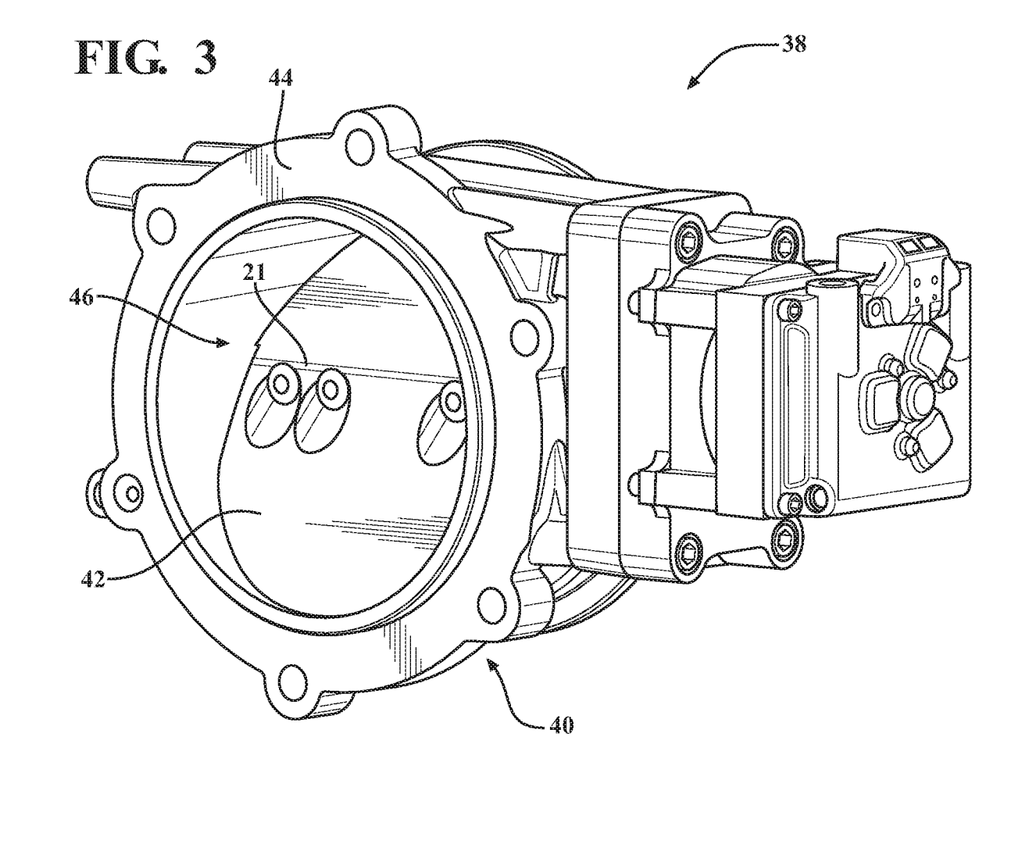
FIG. 3 is a perspective view of a valve for use with the actuator system of FIG. 1.

In another embodiment, the control shaft 21 may be used in a valve 38. The output shaft 36 may be coupled to the control shaft 21 of the valve 38, as shown in FIG. 3. Movement of the output shaft 36 between the plurality of positions may move the control shaft 21 of the valve 38 between a plurality of positions. The valve 38 may be further defined as a butterfly valve 40. The butterfly valve 40 may include a plate 42 coupled to the control shaft 21 and pivotally disposed within a valve housing 44 defining a bore 46, with the plate 42 capable of changing the cross-sectional area of the bore 46 between the plurality of positions to alter the flow of the fluid. One having ordinary skill in the art will appreciate that the valve 38 may be any particular valve capable of controlling the flow of a fluid, such as a poppet valve, a flap valve, or a ball valve.

The plurality of positions of the control shaft 21 of the valve 38 may include a fully open position and a fully closed position. When the control shaft 21 of the valve 38 is in the fully open position, the valve 38 induces the least amount of restriction to the flow of the fluid. When the control shaft 21 of the valve 38 is in the fully closed position, the valve 38 induces the greatest amount of restriction to the flow of the fluid. The greatest amount of restriction to the flow of the fluid may result in complete stop of fluid flow. The plurality of positions may include at least one intermediate position between the fully open position and the fully closed position capable of partially restricting the flow of the fluid. One having ordinary skill in the art will appreciate that the plurality of positions of the control shaft 21 of the valve 38 may be any number of positions and any type of position to create a desire fluid flow. One having ordinary skill in the art will appreciate that the actuator system 20 may be configured to actuate any suitable component through the rotation of the output shaft 36.

Figure 2:
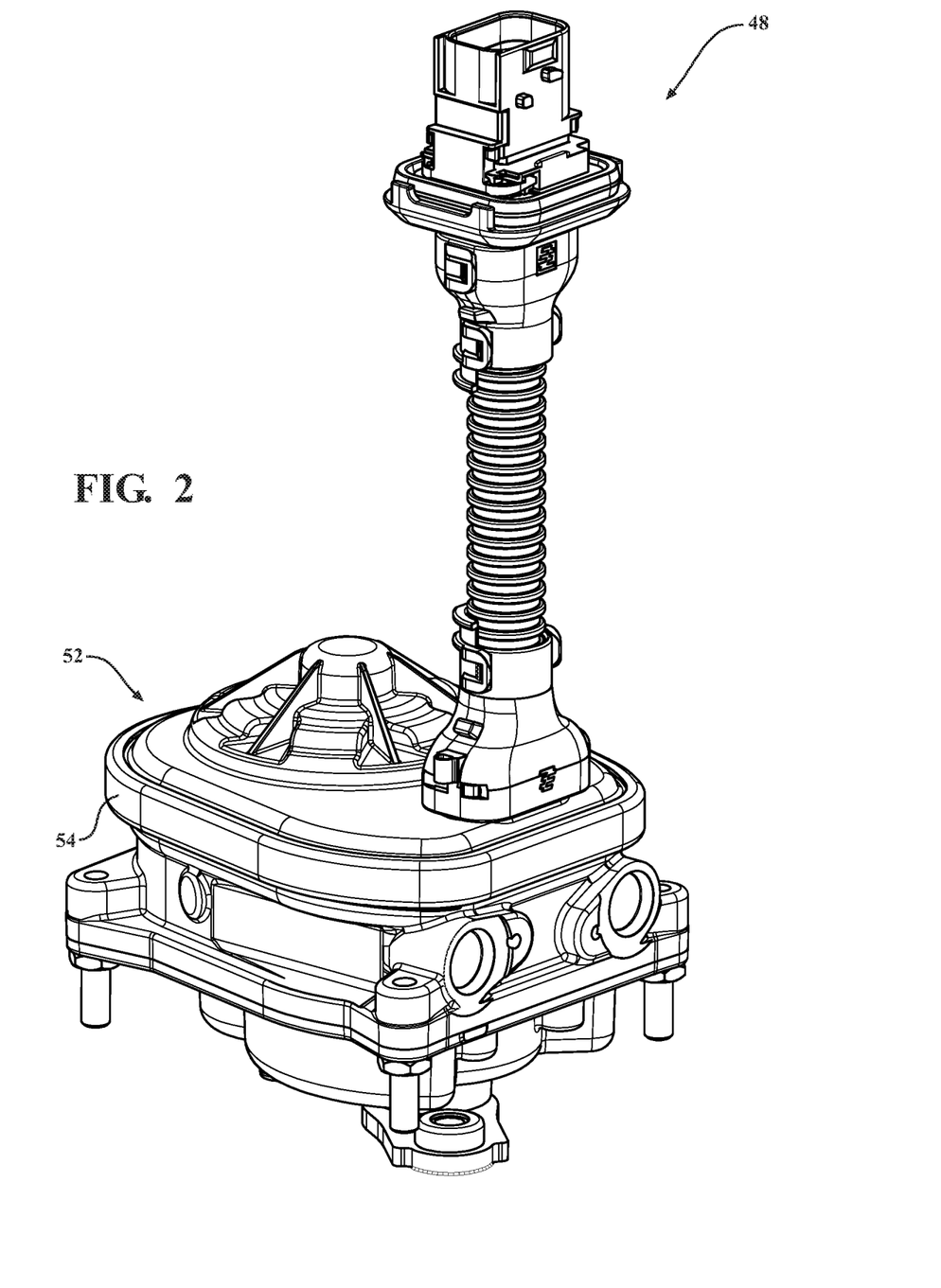
FIG. 2 is a perspective view of an actuator of the actuator system of FIG. 1 illustrating a motor and a gear drive assembly, according to the present invention.
Figure 4:
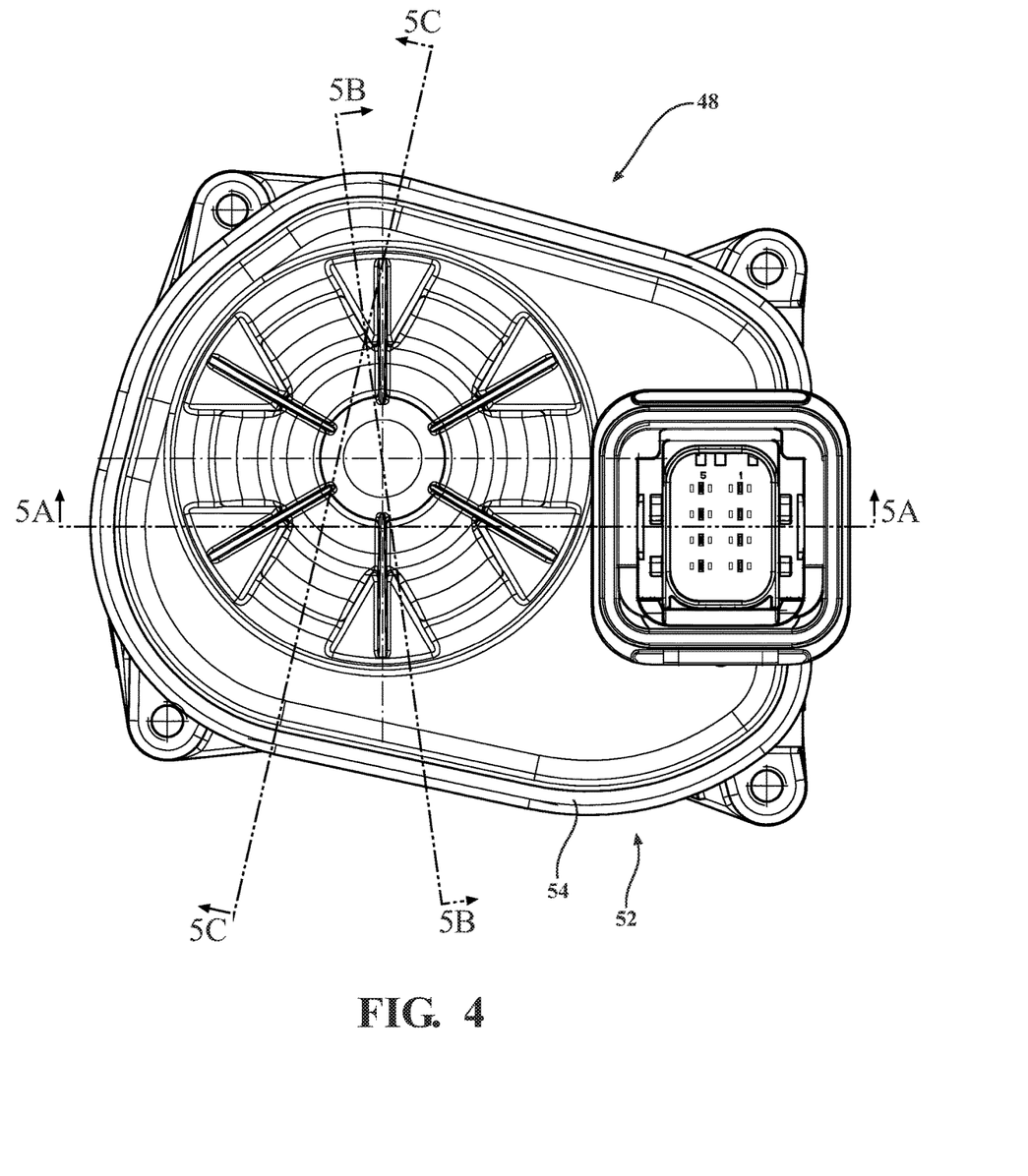
FIG. 4 is a top elevational view of the actuator of FIG. 2.

The actuator system 20 also includes an actuator 48, which is shown in FIGS. 2 and 4. The actuator 48 is capable of moving the output shaft 36 between the plurality of positions. As such, the actuator 48 may be configured to meet desired velocity and torque characteristics of the output shaft 36. The actuator 48 may be capable of having first and second outputs. It is to be appreciated that the actuator 48 may be configured to have any number of suitable outputs.

Figure 5A:
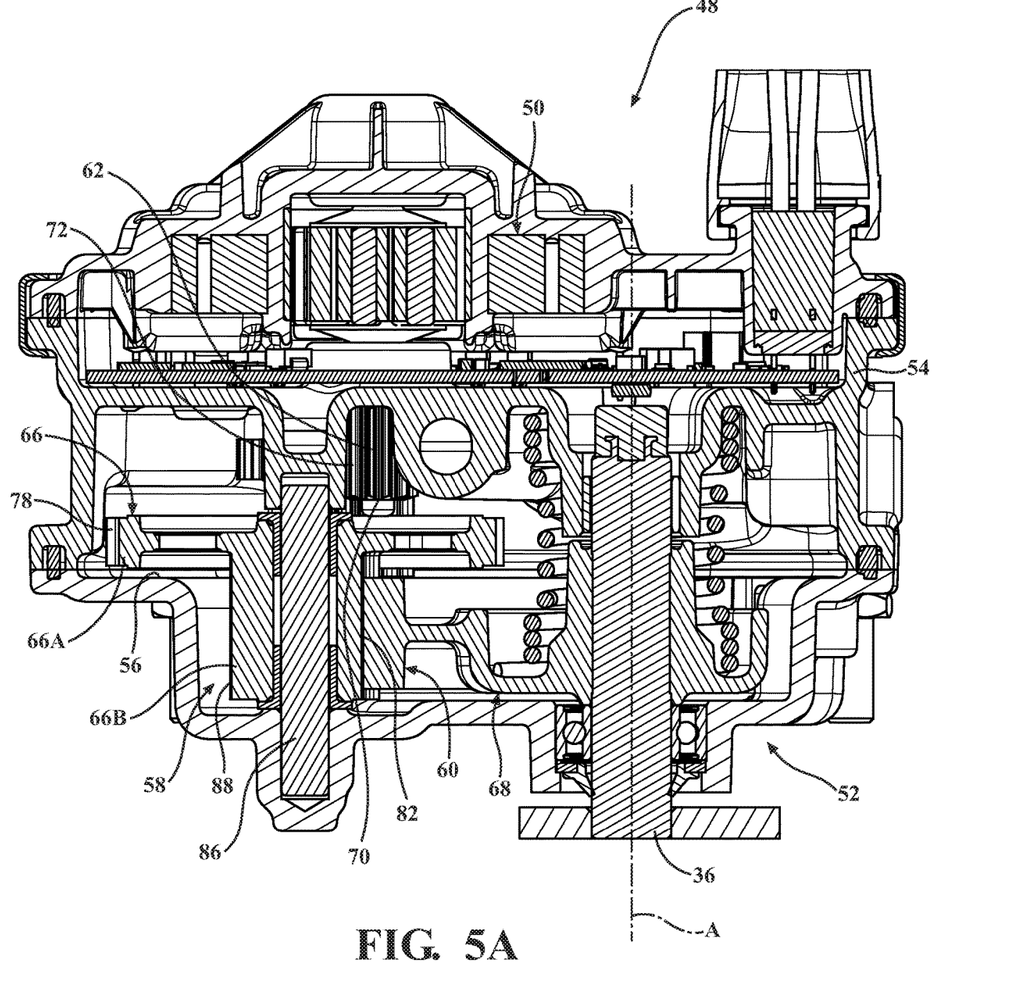
FIG. 5A is a cross-sectional view taken along line 5A-5A of FIG. 4.
Figure 5B:
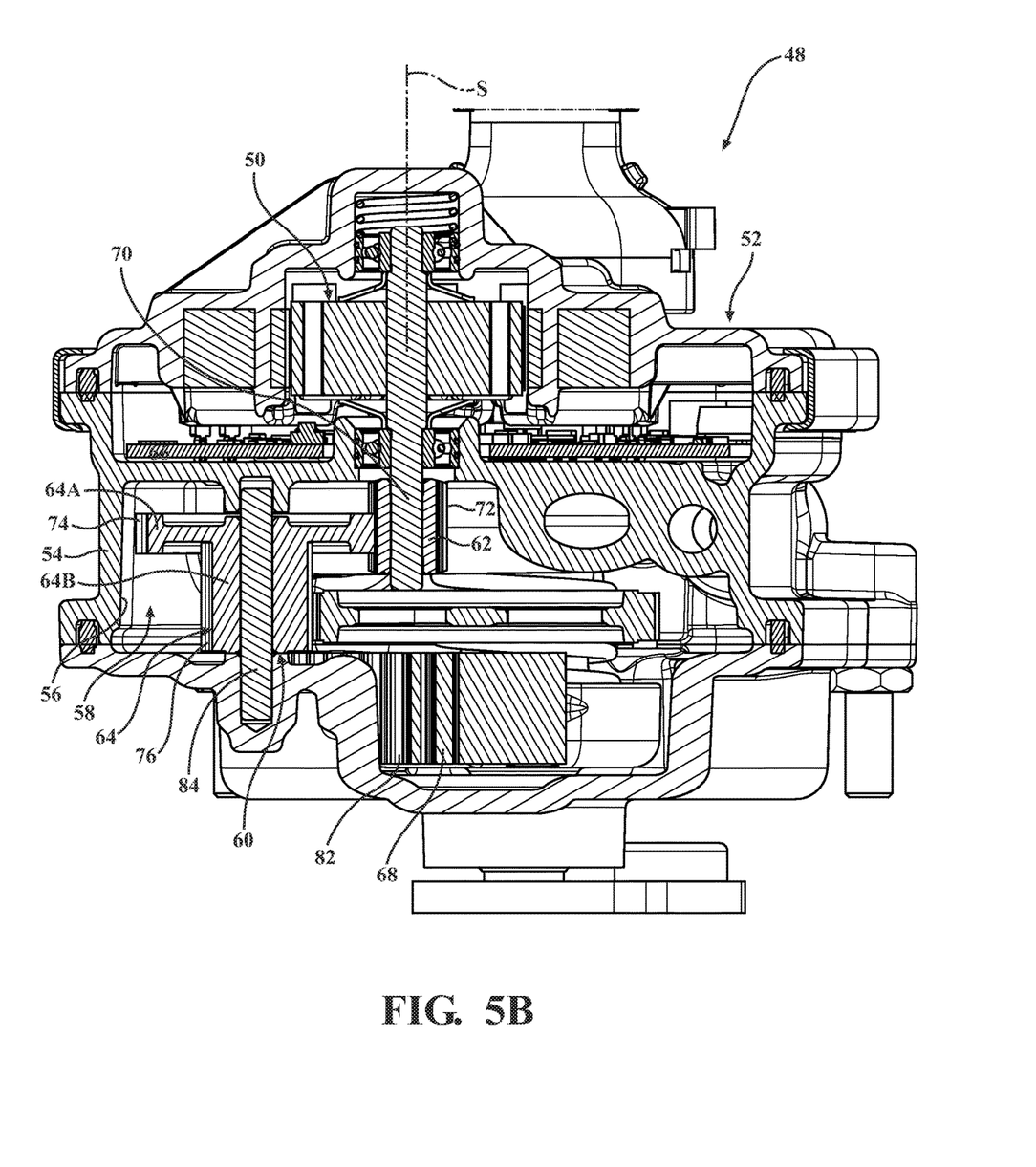
FIG. 5B is a cross-sectional view taken along line 5B-5B of FIG. 4.
Figure 5C:
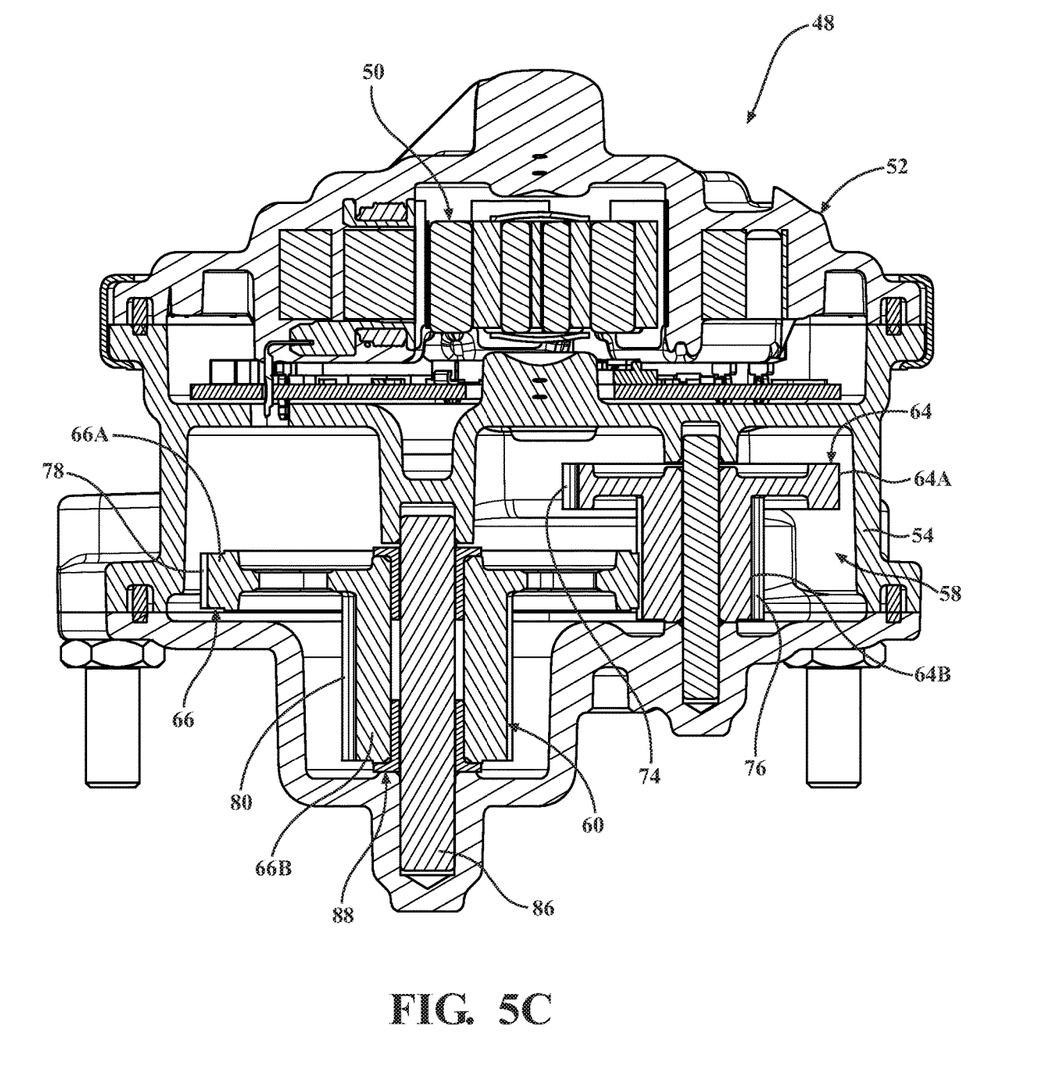
FIG. 5C is a cross-sectional view taken along line 5C-5C of FIG. 4.

Furthermore, the actuator 48 may produce rotary or linear motion. For illustrative purposes, the actuator 48 shown in the Figures produces rotary motion. The actuator 48 includes a motor 50 (FIGS. 5A-5C). The motor 50 may be a direct current (D.C.) motor. The D.C. motor may or may not include brushes to produce motion. The motor 50 may be configured to be controlled by an electrical control signal. More specifically, at least one of the ECU 30 and the actuator controller 32 control the motor 50 (and, moreover, the actuator 48) by the electrical control signal. One having ordinary skill in the art will appreciate that the motor 50 and the actuator 48 may be controlled by any suitable mechanism, such as a mechanical switch.

As illustrated in FIGS. 2, 4, and 5A-5C, the actuator system 20 further includes a gear drive assembly 52, according to one embodiment of the present invention, driven by the motor 50 of the actuator 48. The gear drive assembly 52 may include a housing 54. The housing 54 includes an internal surface 56 defining a cavity 58 and a gear arrangement, generally indicated at 60, disposed in the cavity 58. The gear arrangement 60 includes at least three gear stages. In one embodiment, the gear arrangement 60 includes a drive gear 62 and at least three driven gears including a first driven gear 64, a second driven gear 66, and at least one third driven gear 68. In one embodiment, the first driven gear 64 includes a first gear section 64A and a second gear section 64B and the second driven gear 66 includes a first gear section 66A and a second gear section 66B. The drive gear 62 is engageable with the first gear section 64A of the first driven gear 64, the second gear section 64B of the first driven gear 64 is engageable with the first gear section 66A of the second driven gear 66, the second gear section 66B of the second driven gear 66 is engageable with the at least one third driven gear 68 to transmit rotation from the drive gear 62 to the at least one third driven gear 68. In one embodiment, the drive gear 62 is rotatably coupled to a motor housing. In another embodiment, the drive gear 62 may be operably coupled to the actuator housing 54. The driven gears 64, 66, 68 are each rotatably coupled with the housing 54. The drive gear 62 and the driven gears 64, 66, 68 have a gear ratio to selectively move the output shaft 36 and the base pitch is the same for each gear stage. One having ordinary skill in the art will appreciate that gear ratios may be determined by the respective diameters of the gears or by a number of gear teeth of each gear.

As illustrated in FIGS. 5A-5C, the motor 50 may have a shaft 70 rotatable about a shaft axis S and capable of transmitting rotational force with the shaft 70. The shaft 70 may extend through the housing 54 and may be at least partially disposed in the cavity 58, with the drive gear 62 operably coupled with the shaft 70. Furthermore, the drive gear 62 may be fixed to and rotatable with the shaft 70 about the shaft axis S. As such, the drive gear 62 is fixed to the shaft 70 such that motion of the shaft 70 is imparted directly to the drive gear 62. One having ordinary skill in the art will appreciate that the drive gear 62 may be coupled to the shaft 70 in any suitable way.

Figure 6:
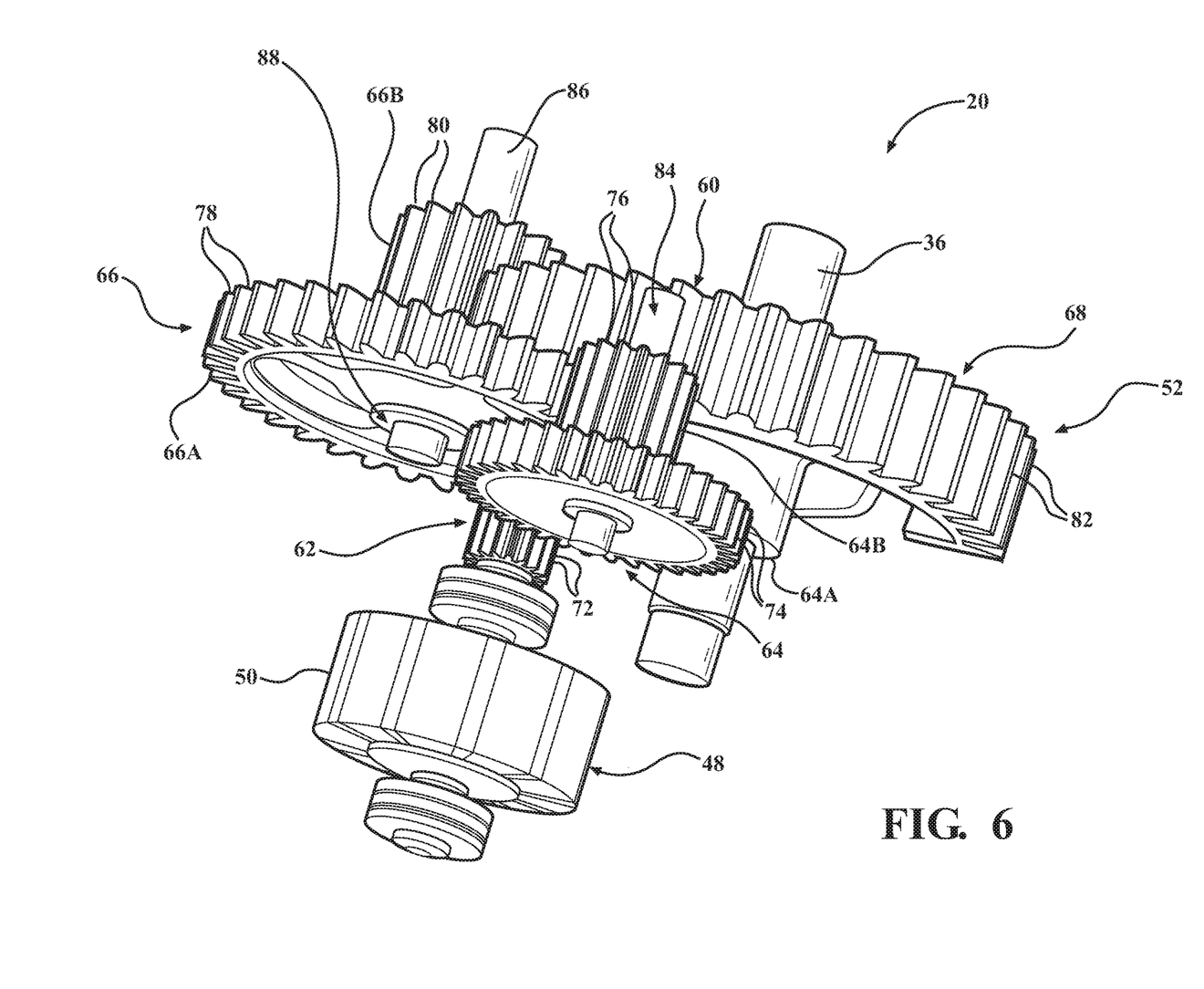
FIG. 6 is a perspective view of a gear arrangement of the gear drive assembly of either FIG. 3 or FIG. 4.
Figure 7:
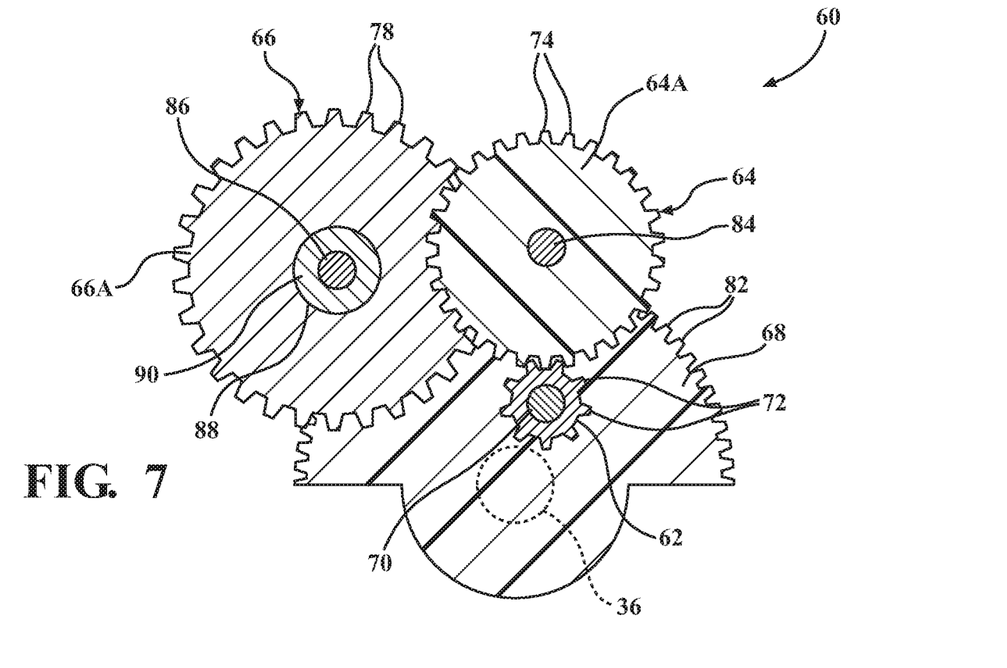
FIG. 7 is a front elevational view of the gear arrangement of FIG. 6.
Figure 8:
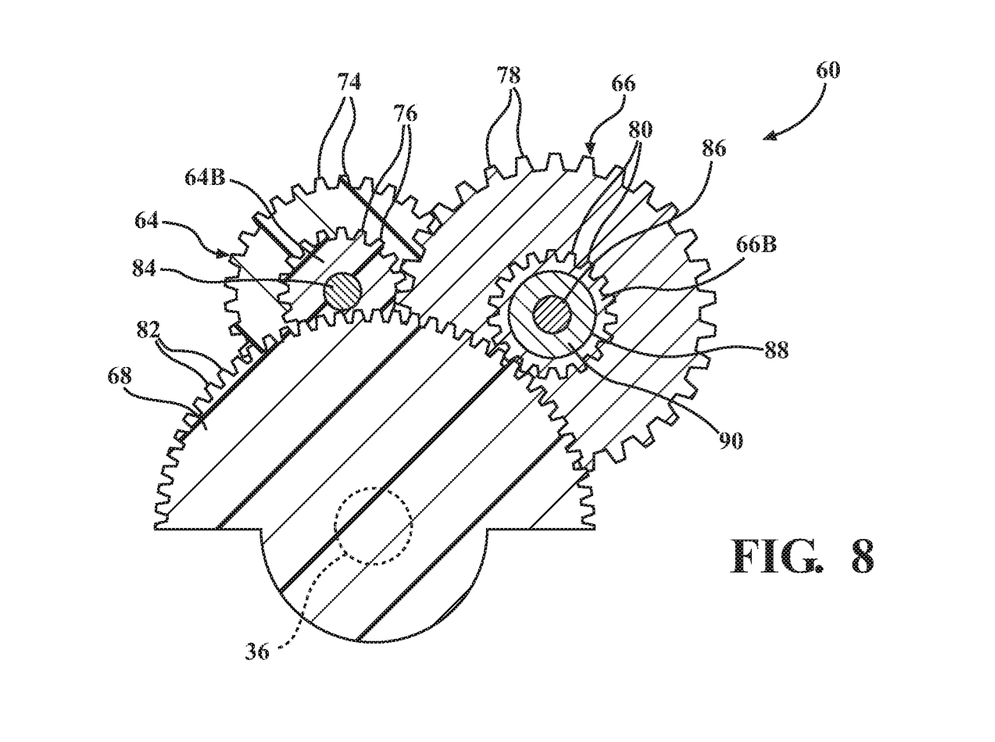
FIG. 8 is a rear elevational view of the gear arrangement of FIG. 6.

As illustrated in FIGS. 6-8, the drive gear 62 may have a plurality of gear teeth 72 extending radially and defining an input diameter of the drive gear 62. As shown in the Figures, the drive gear 62 may have a substantially circular configuration. As such, the drive gear 62 may be referred to as a spur gear. Furthermore, the drive gear 62 may be comparatively smaller than the first driven gear 64, the second driven gear 66, and the at least one third driven gear 68. As such, the drive gear 62 may be referred to as a pinion gear. One having skill in the art will appreciate that the drive gear 62 may have any suitable gear configuration, such as a bevel gear configuration.

The first driven gear 64 may have a plurality of gear teeth 74 on the first gear section 64A extending radially and defining an output diameter of the first driven gear 64. The first driven gear 64 may have a plurality of gear teeth 76 on the second gear section 64B extending radially. As shown in the Figures, the first driven gear 64 may have a substantially circular configuration. As such, the first driven gear 64 may be referred to as a spur gear. Furthermore, the first driven gear 64 may have the first gear section 64A and the second gear section 64B spaced from and fixed to the first gear section 64A. Both of the first and second gear sections 64A, 64B may have a substantially circular configuration. As such, the first driven gear 64 may be referred to as two spur gears. In addition, the first and second gear sections 64A, 64B may be fixed to one another such that the first and second gear sections 64A, 64B rotate in unison about an axis. As such, the first driven gear 64 may be referred to as a compound gear. One having ordinary skill in the art will appreciate that the first driven gear 64 may have any suitable gear configuration, such as a bevel gear configuration.

The second driven gear 66 of the gear arrangement 60 may have a plurality of gear teeth 78 on the first gear section 66A extending radially and defining an output diameter of the second driven gear 66. The second driven gear 66 may have a plurality of gear teeth 80 on the second gear section 66B extending radially. As shown in the Figures, the second driven gear 66 may have a substantially circular configuration. As such, the second driven gear 66 may be referred to as a spur gear. Furthermore, the second driven gear 66 may have the first gear section 66A and the second gear section 66B spaced from and fixed to the first gear section 66A. Both of the first and second gear sections 66A, 66B may have a substantially circular configuration. As such, the second driven gear 66 may be referred to as two spur gears. In addition, the first and second gear sections 66A, 66B may be fixed to one another such that the first and second gear sections 66A, 66B rotate in unison about an axis. As such, the second driven gear 66 may be referred to as a compound gear. One having ordinary skill in the art will appreciate that the second driven gear 66 may have any suitable gear configuration, such as a bevel gear configuration.

The third driven gear 68 of the gear arrangement 60 may have a plurality of gear teeth 82 extending radially and defining an output diameter of the third driven gear 68. As shown in the Figures, the third driven gear 68 may have a substantially semi-circular configuration. As such, the third driven gear 68 may be referred to as a half spur gear. The third driven gear 68 may be rotatable about the axis A and may be operably coupled with the output shaft 36. The output shaft 36 may extend through the housing 54 from the cavity 58 along the axis A. The output shaft 36 may be supported by the housing 54 by a bearing and a bushing, which allows the output shaft 36 to rotate about the axis A. The rotation of the at least one third driven gear 68 may rotate the output shaft 36 between the plurality of positions. In one embodiment, the at least one third driven gear 68 may be fixed to the output shaft 36 in what is commonly referred to in the art as a three-stage gear drive. One having ordinary skill in the art will appreciate that the at least one third driven gear 68 may have any suitable gear configuration, such as a complete spur gear or a bevel gear configuration.

As illustrated in FIGS. 6-8, the gear teeth 74 of the first gear section 64A of the first driven gear 64 may be engageable with the gear teeth 72 of the drive gear 62 to define a first gear stage. The gear teeth 76 of the second gear section 64B of the first driven gear 64 engages the gear teeth 78 of the first gear section 66A of the second driven gear 66 to define a second gear stage. The gear teeth 80 of the second gear section 66B of the second driven gear 66 may be engageable with the gear teeth 82 of the at least one third driven gear 68 to define a third gear stage.

In the gear arrangement 60, the drive gear 62 is made from a metal material. The first driven gear 64 is made from a plastic material. The second driven gear 66 is made from a metal material. The at least one third driven gear 68 is made from a plastic material. In the embodiment illustrated, the at least one third driven gear 68 is also the last gear in the gear arrangement, which can also be referred to as the output gear. It should be appreciated that any gear stages after the at least one third driven gear 68 are made from metal-plastic gear material combinations for each subsequent gear.

The gear drive assembly 52 also includes a first stationary pin 84 that rotatably supports the first driven gear 64 and a second stationary pin 86 that rotatably supports the second driven gear 66. Each of the stationary pins 84 and 86 are generally cylindrical in shape. Each of the stationary pins 84 and 86 are made of a metal material and coupled to the housing 54. The gear drive assembly 52 further includes a pair of plastic bushings 88, one on each end, to support the second driven gear 66 that interfaces with the second stationary pin 86. Each of the plastic bushings 88 have a relatively thin cross section which allows the metal second driven gear 66 to be easily interchangeable with a lower cost plastic version of the same tooth geometry. Each of the bushings 88 are generally cylindrical in shape and have a flange 90 extending radially outwardly. It should be appreciated that the first driven gear 64 and the second driven gear 66 rotate about the first stationary pin 84 and the second stationary pin 86, respectively.

The operation of transmitting rotation from the motor 50 to the output shaft 36 in accordance with the embodiment shown in the Figures is described below for illustrative purposes. One having ordinary skill in the art will appreciate that, although not expressly recited herein, numerous operations are possible in accordance with the present invention.

When the motor 50 is activated, the motor 50 rotates the shaft 70 about the shaft axis S. The shaft 70 is coupled to the drive gear 62, which causes the drive gear 62 to rotate about the axis S. The drive gear 62 engages the first gear section 64A of the first driven gear 64 at the first stage, which causes the first driven gear 64 to rotate about its axis. The first gear section 64A and the second gear section 64B of the first driven gear 64 are fixed to one another. As such, rotation of the first gear section 64A results in simultaneous rotation of the second gear section 64B.

The second gear section 64B of the first driven gear 64 engages the first gear section 66A of the second driven gear 66, at the second stage, which causes the second driven gear 66 to rotate about its axis. The first gear section 66A and the second gear section 66B of the second driven gear 66 are fixed to one another. As such, rotation of the first gear section 66A results in simultaneous rotation of the second gear section 66B. The second gear section 66B of the second driven gear 66 engages the third driven gear 68 at the third stage, which causes the at least one third driven gear 68 to rotate about the axis A. The at least one third driven gear 68 is coupled to the output shaft 36, which causes the output shaft 36 to rotate about the axis A between the plurality of positions.

Figure 9:
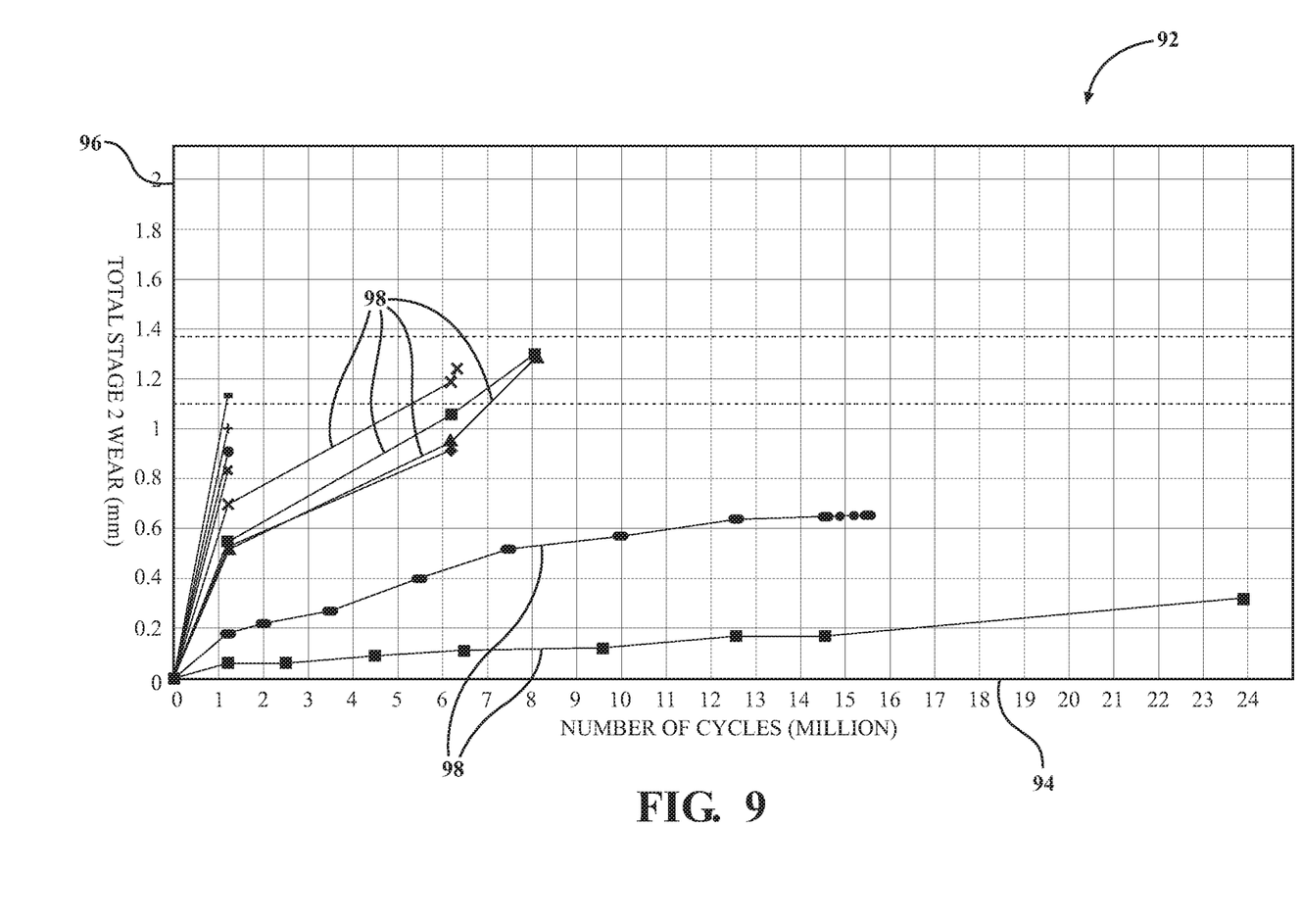
FIG. 9 is a graph showing measured wear at stage two of the gear arrangement versus number of test cycles.

Referring to FIG. 9, a graph 92 showing measured wear at stage two of the gear arrangement 60 versus number of test cycles is shown. This test example is from an actuator durability cycling test where temperature is cycled from −40 degrees C. to +140 degrees C. with the actuator 48 moving against an applied external load. The graph 92 includes an X-axis 94 that represents number of cycles in the millions and a Y-axis 96 that represents total stage two wear in millimeters (mm). The graph 92 includes a plurality of plots 98 representing various material combinations for the stage two gears. Two of the plots 98 showing the least amount of wear are the material combinations of a metal gear and a plastic gear.

Accordingly, the gear drive assembly 52 of the present invention includes the gear arrangement 60 with a metal driven gear in combination with plastic driven gears at each stage. The metal-plastic coupling provides a significant improvement in gear wear. By having plastic driven gears for one-half of the coupling, a cost advantage is achieved versus a full metal system, while still getting a big advantage in wear performance by using metal for the other one-half of the coupling.

The present invention has been described in an illustrative manner. It is to be understood that the terminology which has been used is intended to be in the nature of words of description rather than of limitation. As is now apparent to those skilled in the art, many modifications and variations of the subject invention are possible in light of the above teachings.

It is, therefore, to be understood that within the scope of the appended claims, wherein reference numerals are merely for convenience and are not to be in any way limiting, the present invention may be practiced otherwise than as specifically described.

What is claimed is:

1. A gear drive assembly for use with and driven by a motor in an actuator of an actuator system, said gear drive assembly comprising:
   a housing; and
   a gear arrangement disposed in said housing and comprising at least three gear stages having at least three driven gears;
   wherein said at least three driven gears alternate between a plastic material and a metal material for each gear of said at least three driven gears,
   wherein said gear arrangement comprises a drive gear, a first driven gear, a second driven gear, and at least one third driven gear to transmit rotation from said drive gear to said at least one third driven gear,
   wherein said drive gear is made from a metal material,
   wherein said first driven gear is made from a plastic material,
   wherein said second driven gear is made from a metal material,
   wherein said at least one third driven gear is made from a plastic material,
   wherein said first driven gear includes a first gear section having plastic gear teeth that are engageable with metal gear teeth of said drive gear and a second gear section having plastic gear teeth that are engageable with metal gear teeth of a first gear section of said second driven gear,
   wherein metal gear teeth of a second section of said second driven gear are engageable with plastic gear teeth of said third driven gear.

2. The gear drive assembly as set forth in claim 1, wherein said at least one third driven gear is rotatably coupled with said housing.

3. The gear drive assembly as set forth in claim 1, wherein the gear teeth of each of the first and second sections of each of the first and second driven gears extend radially, wherein the first and second gear sections of the first driven gear are spaced apart and rotate in unison about an axis and wherein the first and second gear sections of the second driven gear are spaced apart and rotate in unison about an axis.

4. The gear drive assembly as set forth in claim 2, including a first stationary pin coupled to said housing to rotatably support said first driven gear.

5. The gear drive assembly as set forth in claim 4, including a second stationary pin coupled to said housing to rotatably support said second driven gear.

6. The gear drive assembly as set forth in claim 5, including a pair of bushings disposed on each end of said second driven gear and about said second stationary pin.

7. The gear drive assembly as set forth in claim 6, wherein said bushings are made from a plastic material.

8. An actuator system comprising:
   an output shaft;
   an actuator capable of moving said output shaft; said actuator comprising:
      a motor;
      a gear drive assembly driven by said motor; said gear drive assembly comprising:
         a housing; and
         a gear arrangement disposed in said housing and comprising a drive gear, a first driven gear, a second driven gear, and at least one third driven gear to transmit rotation from said drive gear to said at least one third driven gear, with said at least one third driven gear rotatably coupled with said housing;

wherein said drive gear is made from a metal material, wherein said first driven gear is made from a plastic material, wherein said second driven gear is made from a metal material, wherein said at least one third driven gear is made from a plastic material, wherein said first driven gear includes a first gear section having plastic gear teeth that are engageable with metal gear teeth of said drive gear and a second gear section having plastic gear teeth that are engageable with metal gear teeth of a first gear section of said second driven gear, wherein metal gear teeth of a second section of said second driven gear are engageable with plastic gear teeth of said third driven gear.

9. The actuator system as set forth in claim 8, including a first stationary pin coupled to said housing to rotatably support said first driven gear and a second stationary pin coupled to said housing to rotatably support said second driven gear.

10. The actuator system as set forth in claim 9, including a pair of bushings made from a plastic material and disposed on each end of said second driven gear and about said second stationary pin, wherein each of the bushings include a flange extending radially outwardly.

11. An actuator system comprising:

a motor having a shaft rotatable about a shaft axis and capable of transmitting rotational force with said shaft, with said motor configured to be controlled by an electrical control signal;

a gear drive assembly driven by said motor; said gear drive assembly comprising:

a housing having a cavity; and a gear arrangement disposed in said cavity and comprising a drive gear made from a metal material, a first driven gear made from a plastic material, a second driven gear made from a metal material, and at least one third driven gear made from a plastic material to transmit rotation from said drive gear to said at least one third driven gear;

wherein said first driven gear includes a first gear section having plastic gear teeth that are engageable with metal gear teeth of said drive gear and a second gear section having plastic gear teeth that are engageable with metal gear teeth of a first gear section of said second driven gear, wherein metal gear teeth of a second section of said second driven gear are engageable with plastic gear teeth of said third driven gear;

a first stationary pin coupled to said housing to rotatably support said first driven gear and a second stationary pin coupled to said housing to rotatably support said second driven gear; and a pair of bushings made from a plastic material and disposed on each end of said second driven gear and about said second stationary pin.

12. The actuator system as set forth in claim 8, including an electronic control unit and an actuator controller.

* * * * *